(12) United States Patent
Lin et al.

(10) Patent No.: US 8,437,095 B2
(45) Date of Patent: May 7, 2013

(54) COMPACT LENS MODULE

(75) Inventors: Fang-Sheng Lin, New Taipei (TW); Yun-Kai Yu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 36 days.

(21) Appl. No.: 13/276,332

(22) Filed: Oct. 19, 2011

(65) Prior Publication Data
US 2013/0038954 A1 Feb. 14, 2013

(51) Int. Cl.
*G02B 7/02* (2006.01)
(52) U.S. Cl.
USPC .......................................... 359/819; 359/811
(58) Field of Classification Search .......... 359/694–700, 359/811–824, 665, 666
See application file for complete search history.

(56) References Cited

U.S. PATENT DOCUMENTS

| 7,466,492 B2* | 12/2008 | Tseng et al. | 359/665 |
| 8,144,243 B2* | 3/2012 | Kang | 348/374 |
| 2007/0057150 A1* | 3/2007 | Webster | 250/208.1 |

* cited by examiner

*Primary Examiner* — Mohammed Hasan
(74) *Attorney, Agent, or Firm* — Altis Law Group, Inc.

(57) ABSTRACT

A compact lens module includes a lens seat, a lens group, a first and a second circuit boards. The lens seat includes a top surface, a bottom surface opposite to the top surface, and a first side surface connecting the top surface to the bottom surface. The lens seat defines a receiving space extending through the top surface and the bottom surface, and a receiving groove on the first side wall. The lens group is received in the receiving space. The first circuit board is mounted on the bottom surface of the lens seat, and holds an image sensor aligned with the lens group. The second circuit board is received in the receiving groove. The second circuit board holds a lens drive circuit and electrically connected with the lens group and the first circuit board.

4 Claims, 4 Drawing Sheets

COMPACT LENS MODULE

BACKGROUND

1. Technical Field

The present disclosure relates to a lens module.

2. Description of Related Art

A lens module usually includes a lens seat, a lens group positioned in the lens seat, and a circuit board positioned on the bottom of the lens seat. An image sensor and a lens drive circuit are positioned on the circuit board. The image sensor is comparably large scale and must be positioned beneath the lens group, thus there is no space beneath the lens group for positioning the drive circuit. The drive circuit is set on the extending part of the circuit board which extends out from the lens seat. Yet, this makes the whole lens module large and in need of more accommodation space.

Therefore, it is desirable to provide a compact lens module which can overcome the limitations described.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
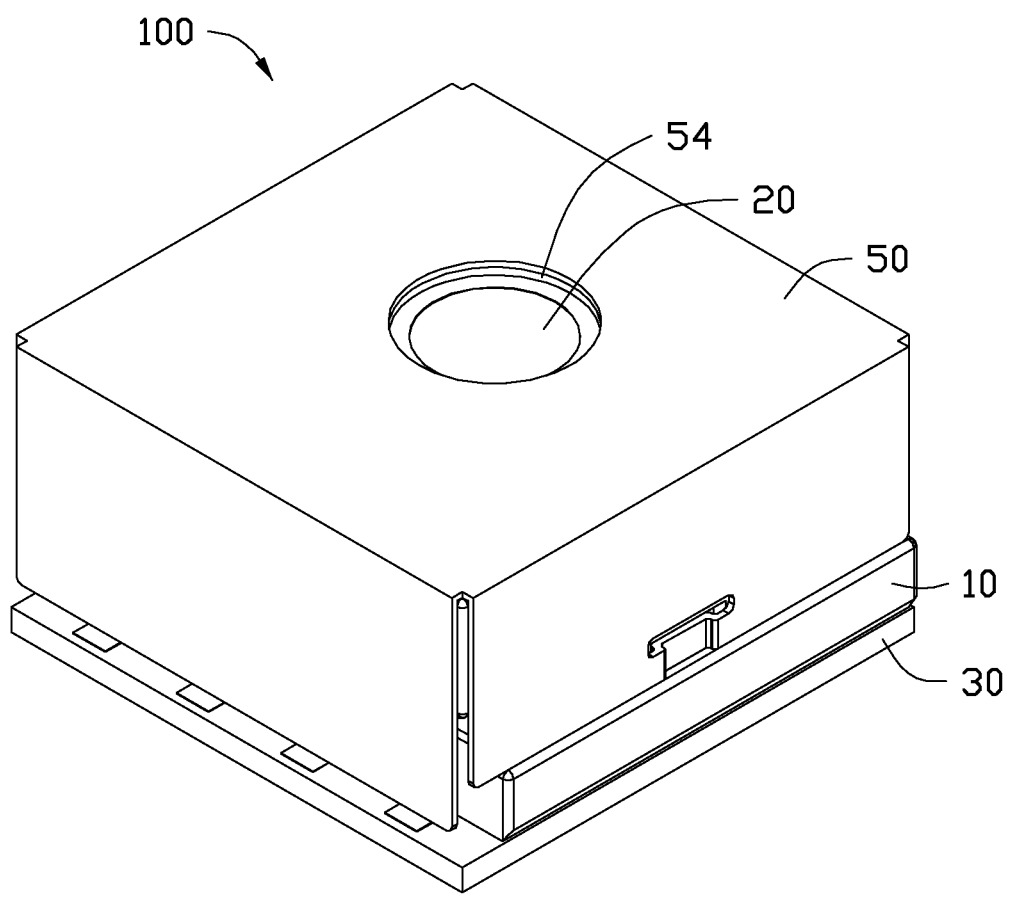
FIG. 1 is a schematic, isometric view of a compact lens module according to an embodiment of the present disclosure.
Figure 2:
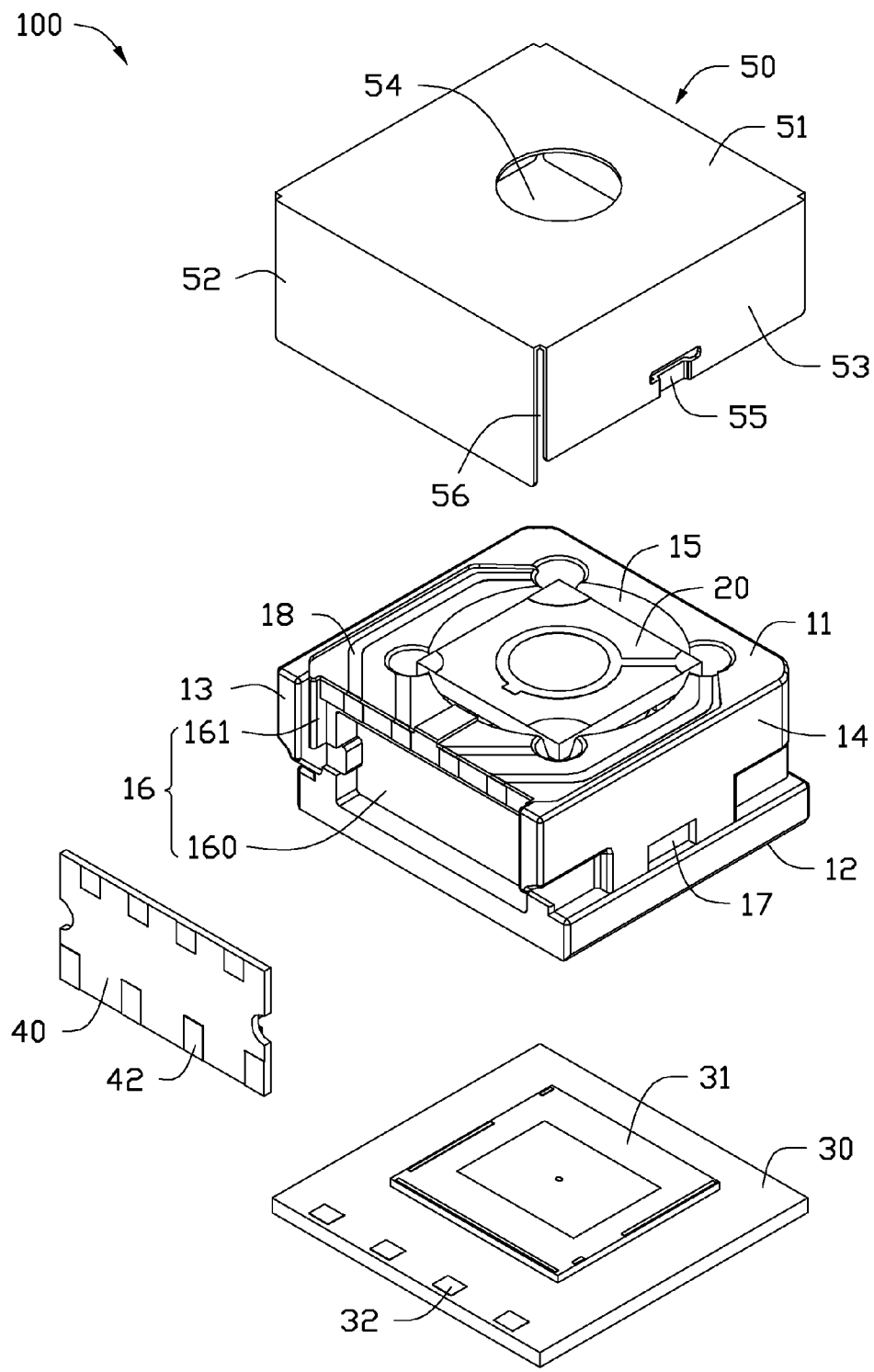
FIG. 2 is an exploded view of the compact lens module of FIG. 1.
Figure 3:
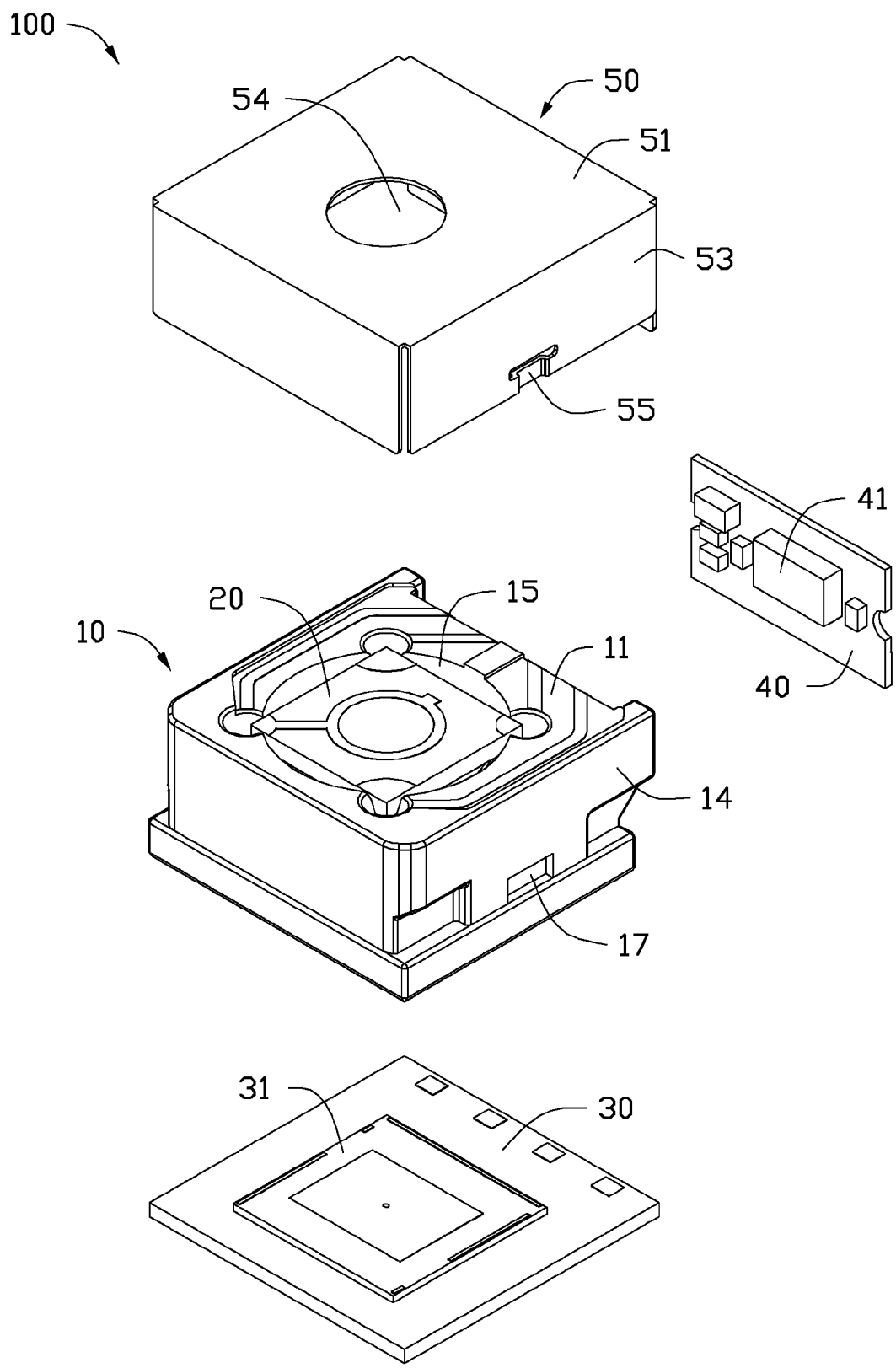
FIG. 3 is similar to FIG. 2, but viewed from another angle.
Figure 4:
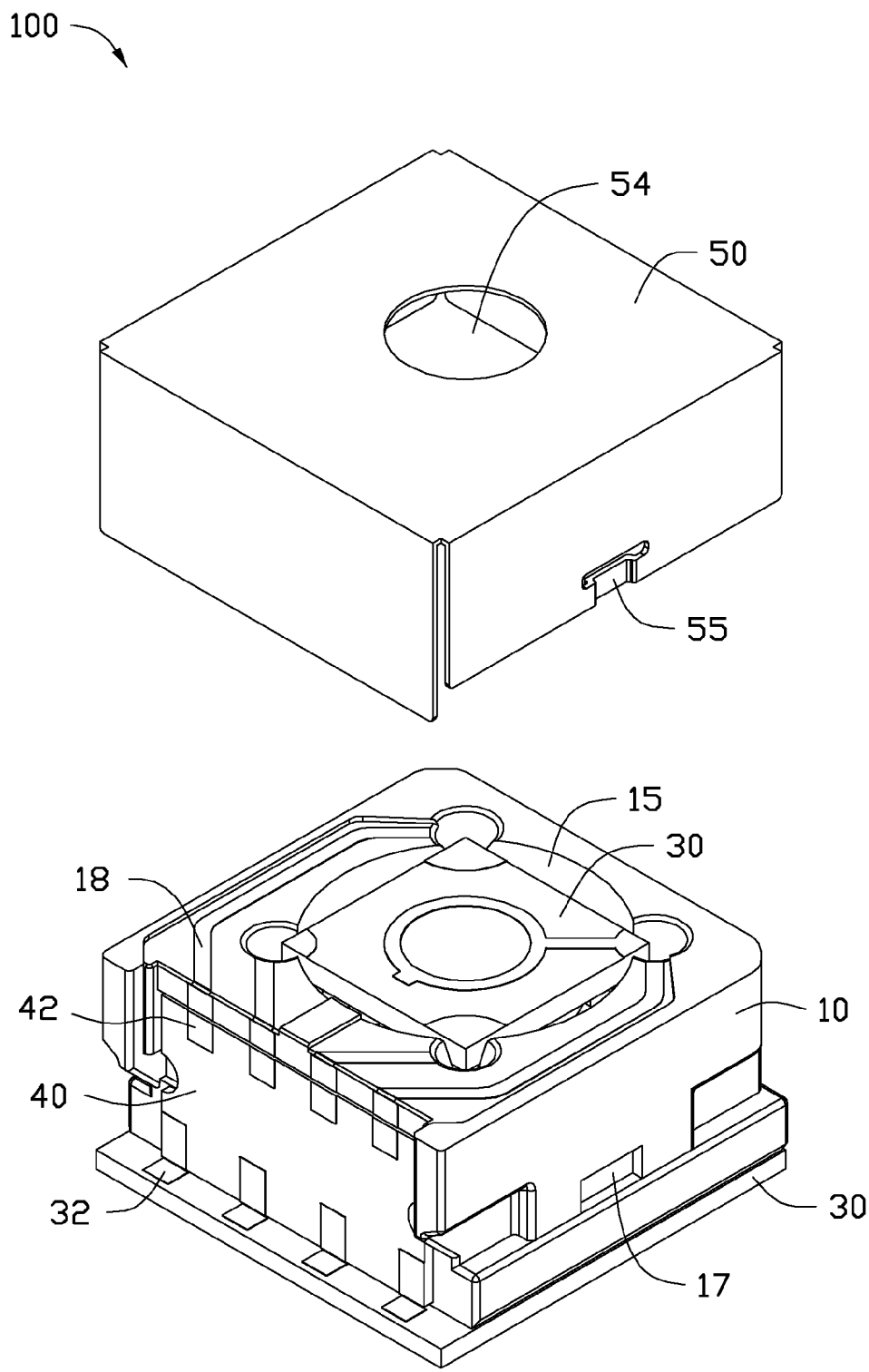
FIG. 4 is another schematic, isometric view of the compact lens module of FIG. 1, with a cover disassembled.

Referring to FIGS. 1 to 4, a compact lens module 100 according to an embodiment is disclosed. The compact lens module 100 includes a lens seat 10, a lens group 20 received in the lens seat 10, a first circuit board 30 holding an image sensor 31, a second circuit board 40 holding a lens drive circuit 41, and a cover 50.

The lens seat 10 is substantially a cube, and includes a top surface 11, an opposite bottom surface 12, a first side surface 13 and three second side surfaces 14 connecting the top surface 11 to the bottom surface 12. The lens seat 10 defines a receiving space 15 extending through the top surface 11 and the bottom surface 12. The receiving space 15 receives the lens group 20. The first side surface 13 defines a receiving groove 16 receiving the second circuit board 40. The receiving space 15 does not communicate with the receiving groove 16. The receiving groove 16 includes a small part 160 adjacent to the receiving space 15 and a large part 161 away from the receiving space 15 relative to the small part 160. The small part 160 is enclosed by sidewalls at four sides. The large part 161 is open at the side adjacent to the bottom surface 12. The second side surfaces 14 respectively define a fixing groove 17. Traces 18 are set on the top surface 11. One end of the traces 18 are electrically connected to the lens group 20, the other end of the traces 18 are positioned adjacent to the receiving groove 16.

The first circuit board 30 holds the image sensor 31 and traces 32 connected with the image sensor 31. The first circuit board 30 is mounted on the bottom surface 12 of the lens seat 10. The image sensor 31 is aligned with the lens group 20. The first circuit board 30 is coplanar with the three second side surfaces 14 respectively, and is projected slightly relative to the first side surface 13, and the projected part of the first circuit board 30 holds one end of the traces 32.

The second circuit board 40 holds the lens drive circuit 41 and traces 42 connected with the lens drive circuit 41. The size of the second circuit board 40 is larger than that of the small part 160, and is smaller than that of the large part 161. The large part 161 receives the second circuit board 40, and the small part 160 receives the lens drive circuit 41. The second circuit board 40 contacts with the first circuit board 30 at the open side of the large part 161. The traces 42 are connected with the traces 18, 32 respectively by means of soldering.

The cover 50 includes a top plate 51, one first side wall 52, and three second side walls 53. The first and second side walls 52, 53 perpendicularly extend from the top plate 51. The first side wall 52 is longer than the second side walls 53. The top plate 51 defines a hole 54 for letting light passing through. Clips 55 are formed on the second side walls 53. Slots 56 are formed between every two first and second side walls 52, 53. The cover 50 covers the lens seat 10 from the top surface 11. The top plate 51 covers the top surface 11. The hole 54 is aligned with the lens group 20. The first side wall 52 covers the second circuit board 40. The clips 55 on the second side walls 53 engage with the fixing grooves 17 respectively to fix the cover 50 on the lens seat 10.

As the first circuit board 30 does not need to hold the lens drive circuit 41, the size of the first circuit board 30 is reduced, and the compact lens module 100 obtains a compact structure and a reduced size.

It will be understood that the above particular embodiments are shown and described by way of illustration only. The principles and the features of the present disclosure may be employed in various and numerous embodiments thereof without departing from the scope of the disclosure. The above-described embodiments illustrate the scope of the disclosure but do not restrict the scope of the disclosure.

What is claimed is:

1. A lens module comprising:
   a lens seat comprising a top surface, a bottom surface opposite to the top surface, and a first side surface connecting the top surface to the bottom surface, the lens seat defining a receiving space extending through the top surface and the bottom surface, and a receiving groove on the first side wall;
   a lens group received in the receiving space;
   a first circuit board mounted on the bottom surface of the lens seat, the first circuit board holding an image sensor aligned with the lens group;
   a second circuit board received in the receiving groove, the second circuit board holding a lens drive circuit and electrically connected with the lens group and the first circuit board; and
   a cover covering the lens seat, the cover defining a hole aligned with the lens group; wherein
   the lens seat further comprises a plurality of second side surfaces connecting the top surface to the bottom surface, each of the second side surfaces defines a fixing groove, the cover comprises a top plate and side walls perpendicularly extending from the top plate, each of the side walls comprises a clip, each clip engages with a respective one of the fixing grooves to secure the cover on the lens seat.

2. The lens module of claim 1, wherein the receiving groove is open at the side adjacent to the bottom surface, the first circuit board and the second circuit board contact with each other through the open side of the receiving groove.

3. The lens module of claim 1, where the cover further defines slots between every two neighboring first and second side walls.

4. The lens module of claim 1, wherein the second circuit board is electrically connected to the first circuit board and the lens group by traces.

* * * * *

UNITED STATES PATENT AND TRADEMARK OFFICE
CERTIFICATE OF CORRECTION

PATENT NO. : 8,437,095 B2  
APPLICATION NO. : 13/276332  
DATED : May 7, 2013  
INVENTOR(S) : Fang-Sheng Lin et al.

Page 1 of 1

It is certified that error appears in the above-identified patent and that said Letters Patent is hereby corrected as shown below:

Item (30) regarding "Foreign Application Priority Data" Insert on the title page of the Patent:

-- (30)   Foreign Application Priority Data

August 9, 2011 (TW) .........................100128332 --

Signed and Sealed this  
Twenty-sixth Day of November, 2013

Margaret A. Focarino  
*Commissioner for Patents of the United States Patent and Trademark Office*